United States Patent
Verzegnassi et al.

(10) Patent No.: US 8,315,580 B2
(45) Date of Patent: Nov. 20, 2012

(54) PROCESS FOR DETECTING TRANSMITTED SYMBOLS BASED ON A TERNARY ALPHABET AND CORRESPONDING RECEIVER

(75) Inventors: Rodolfo Verzegnassi, Antibes (FR); Jianliang Shi, Nuremberg (DE)

(73) Assignee: ST-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 13/377,791

(22) PCT Filed: Jun. 11, 2010

(86) PCT No.: PCT/EP2010/003500
§ 371 (c)(1),
(2), (4) Date: Mar. 6, 2012

(87) PCT Pub. No.: WO2010/142449
PCT Pub. Date: Dec. 16, 2010

(65) Prior Publication Data
US 2012/0157104 A1    Jun. 21, 2012

(30) Foreign Application Priority Data

Jun. 12, 2009 (EP) .................................... 09368018

(51) Int. Cl.
*H04B 1/04* (2006.01)
(52) U.S. Cl. .................. 455/114.2; 455/450; 455/452.2; 455/67.13; 455/67.16; 455/63.1; 455/522; 455/501; 455/222; 455/226.3
(58) Field of Classification Search ............... 455/114.2, 455/450, 67.13, 63.1, 522, 501
See application file for complete search history.

(56) References Cited

U.S. PATENT DOCUMENTS

| | | | |
|---|---|---|---|
| 2006/0159204 A1 * | 7/2006 | Karthik et al. | 375/340 |
| 2008/0200138 A1 * | 8/2008 | Sipila | 455/226.2 |

FOREIGN PATENT DOCUMENTS

WO    2007088469 A    8/2007

OTHER PUBLICATIONS

Zhuan Ye et al: "PHY 28-1—Energy Detection Using Estimated Noise Variance for Spectrum Sensing in Cognitive Radio Networks" A Wireless Communications and Networking Conference, 2008. WCNC 2008. IEEE, IEEE, Piscataway, NJ, USA, Mar. 31, 2008, pp. 711-716, XP031243716.

(Continued)

*Primary Examiner* — Olumide T Ajibade Akonai
*Assistant Examiner* — Randy Peaches
(74) *Attorney, Agent, or Firm* — Howison & Arnott L.L.P.

(57) ABSTRACT

A detection process of a communication channel based on a ternary alphabet is provided wherein the channel transmitting a signal transports the same transmitted symbol for N sequential slots within one Time Transmission Interval (TTI). The detection process comprises a mechanism that eliminates unwanted signal contributions and isolates noise contributions. The detection process estimates a noise variance and sums consecutive received signals of a same Transmission Time Interval (TTI) in order to isolate a transmitted signal portion. The detection further obtains a chi squared distribution, which is used to determine a threshold that is proportional to the estimated noise variance. The threshold is then used to detect the communication channel.

15 Claims, 3 Drawing Sheets

OTHER PUBLICATIONS

Digham F F et al: "On the energy detection of unknown signals over fading channels" ICC 2003. 2003 IEEE International Conference on Communications. Anchorage, AK, May 11-15, 2003; [IEEE International Conference on Communications], New York, NY : IEEE, US, vol. 5, May 11, 2003, pp. 3575-3579, XP010643110.

Patent Cooperation Treaty International Search Report and Written Opinion of PCT/EP2010/003500; Marco Marzenke; Aug. 4, 2010; 14 pages.

European Patent Office; European Search Report; Marco Marzenke; Jan. 15, 2010; 4 pages.

Universal Mobile Telecommunications System (UMTS); Physical channels and mapping of transport channels onto physical channels (FDD) (3GPP TS 25.211 version 7.2.0 Release 7); ETSI TS 125 211; 55 pages.

* cited by examiner

Fig. 3

PROCESS FOR DETECTING TRANSMITTED SYMBOLS BASED ON A TERNARY ALPHABET AND CORRESPONDING RECEIVER

CROSS-REFERENCE TO RELATED APPLICATIONS

This application is a U.S. National Phase application submitted under 35 U.S.C. §371 of Patent Cooperation Treaty application serial no. PCT/EP2010/003500, filed Jun. 11, 2010, and entitled PROCESS FOR DETECTING TRANSMITTED SYMBOLS BASED ON A TERNARY ALPHABET AND CORRESPONDING RECEIVER, which application claims priority to European patent application serial no. 09368018.9, filed Jun. 12, 2009, and entitled DETECTION PROCESS OF A CHANNEL TRANSMITTING SYMBOLS BASED ON A TERNARY ALPHABET AND RECEIVER FOR DOING THE SAME.

Patent Cooperation Treaty application serial no. PCT/EP2010/003500, published as WO 2010/142449, and European patent application serial no. 09368018.9, are incorporated herein by reference.

TECHNICAL FIELD

Embodiments of the invention relate to the field of wireless communication and more particularly to a detection process of channel transmitting symbols based on a ternary alphabet and a receiver for doing the same.

BACKGROUND

High Speed Uplink Packet Access (HSUPA) is a 3G mobile telephony protocol providing high speed uplink transmission. In the 3GPP Release 6 (HSUPA) standard there are two downlink channels, namely E-RGCH and E-HICH, used for controlling the transmission power of the UE and which are based on the use of a ternary alphabet. Those two channels transmit one among three different signals to the User Equipment (UE): UP, DOWN or HOLD for E-RGCH, ACK, NACK or DTX for the E-HICH. These signals are merely transmitted as +1, −1 or 0, and are received as +S, −S, or 0, possibly plus noise.

As known by the man skilled in the art, when the UE has to detect a received signal that could be +S, −S or 0, plus some noise N, and a decision has to be taken on what was transmitted, it is necessary to set two thresholds:

1) a first threshold between 0 and +S in order to detect a +1 or a 0
2) a second threshold between 0 and −S so as to detect a 0 or a −1

Usually the two thresholds are symmetrical so the problem is really reduced to setting one threshold.

Figure 1:
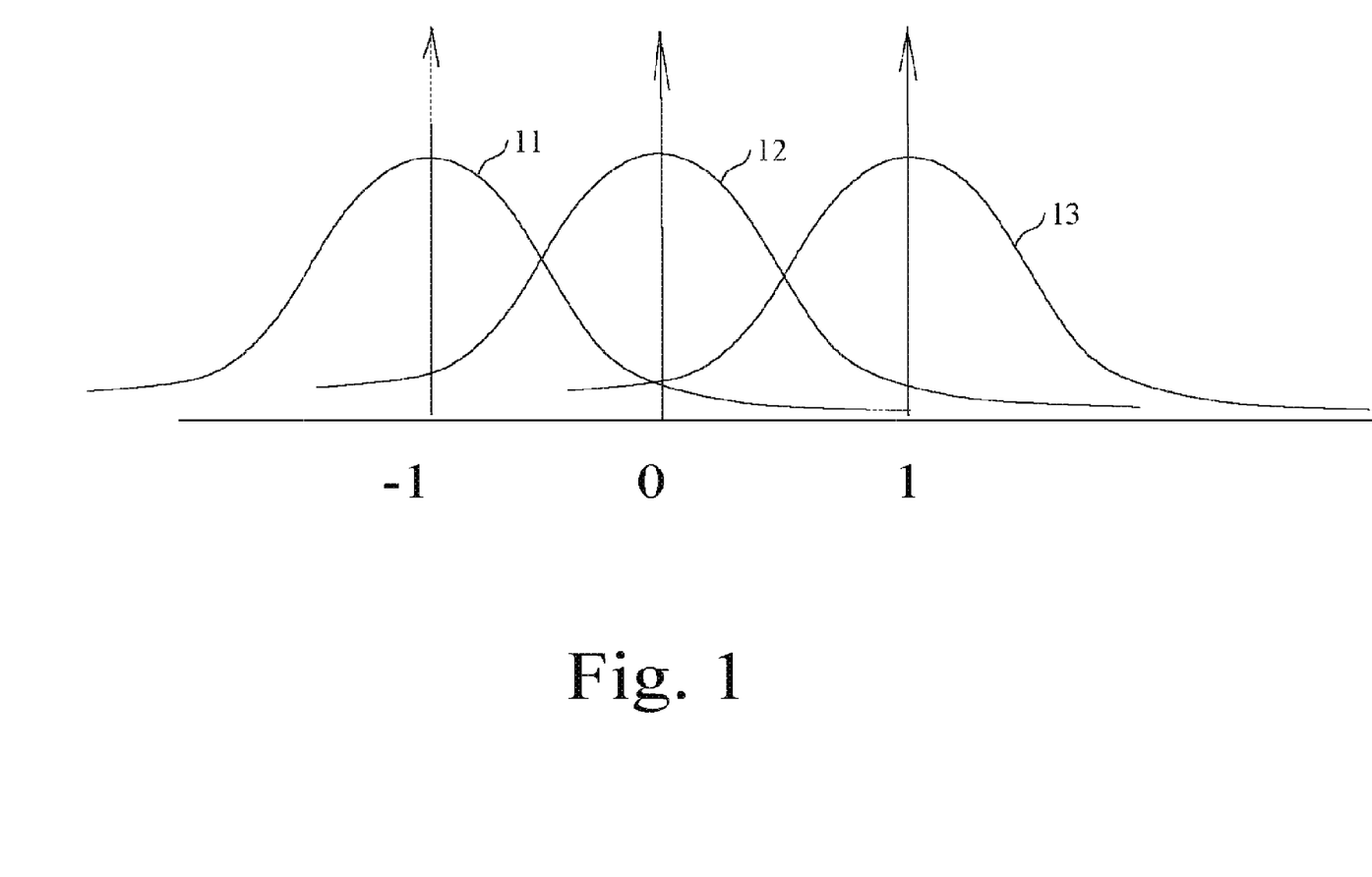
FIG. 1 illustrates the distribution (of the Gaussian type) of the received signal around the three values forming the ternary alphabet.

Now, as shown in FIG. 1, the use of a ternary alphabet results in the existence of three gaussian distributions, referred to as 11, 12 and 13, requiring the need to determine two thresholds for minimizing the misdetection as well as false alarms.

Now, the problem is that in the case of the two channels E-RGCH and E-HICH in HSUPA, but not exclusively, one has unfortunately no information on the value of S, nor on the noise N, deriving in a distribution of the signal around the three values −1, 0 and +1.

Consequently, receiving a signal Y alone does not allow the discrimination between the three possibilities: just noise N, or +S+N or, at least −S+N.

Therefore, there is a need for a specific mechanism allowing the determination of an appropriate threshold to be used in the detection process of a channel transmitting symbols based on a ternary alphabet.

WO 2007/088469 discloses a method that includes measuring, during a measurement period, values corresponding to noise and interference signals received from a channel. The measurement period coincides with a period when no signal is transmitted on the channel.

US 2008/200138 discloses a method wherein a level of a first signal received via first channel is determined. Additionally, a moving average of a plurality of determined levels of the first signal is obtained, and the moving average is subtracted from the determined level. The subtraction result is then used for estimating a noise variance of a second signal received via a second channel.

ZHuan Ye et al: "PHY 28-1 Energy Detection Using Estimated Noise Variance for Spectrum Sensing in Cognitive Radio Networks" Wireless Communications and Networking Conference, IEEE, 31.3.2008, pages 711-716, XP031243716 ISBN 978-1-4244-1997-5, discloses the use of an estimated noise variance to calculate the threshold used in the spectrum sensing based on energy detection.

SUMMARY

Embodiments of the invention to provide a new process achieving determination of the appropriate threshold to be used in a detection process of a channel transmitting symbols based on a ternary alphabet.

Embodiments of the present invention provide a process for determining the appropriate threshold to be used for the detection of the E-RGCH and E-HICH channels when one has no information of the amplitude/power of the received signal.

In other embodiments the invention provides a detection process of the E-RGCH and E-HICH channels which can further provide the control of the percentage of misdetection and false alarms.

These and embodiments objects of the invention are achieved by means of a detection process of a signal which is transmitted over a communication channel, said signal consisting in a sequence of a same symbol which is repeated during N sequential slots within one Time Transmission Interval (TTI), said symbol being extracted from a ternary alphabet, the process involving the following steps to be performed separately on every received signal, (i.e. sequence of N symbols):

subtracting a symbol received at a certain time instant k from the following symbol received at the following time instant k+1 so as to eliminate symbol contribution and to isolate the noise contribution;

estimating the noise variance v by performing the preceding operation N−1 times, that is to say, over all N symbols in the received signal and thus isolating N−1 noise contributions;

summing all consecutive received signals of the same TTI so as to isolate the transmitted signal contribution, plus some residual noise in order to generate a sum which will later be compared to a given threshold for the purpose of determine which particular element of the ternary alphabet was originally transmitted;

squaring said sum so as to obtain a chi squared distribution, that is central if the transmitted signal was 0, non-central if it was +1 or −1.

determining a threshold proportional to said variance;

using said threshold so as to perform detection of the communication channel.

In one particular embodiment, a filtering, such as a low-pass filter is applied on the estimated variance, before using it for the determination of the threshold.

The process is particularly suitable for detecting the E-HICH and E-RGCH communication channels which are decoded after dispreading and signature correlation.

In one particular embodiment, a look-up table is used for the purpose of providing one particular coefficient to be multiplied to the estimation of the variance so as to provide an accurate control of the detection process. The look-up table therefore provides different thresholds, corresponding to different scenarios, i.e. to different required ratios of missed detection (a +S or a −S detected as a 0) and false detection (a 0 detected as a +S or a −S).

A first scenario corresponds to the situation of a transmission of E-HICH channel in single link, and the look-up table provides an appropriate coefficient matching that scenario.

Alternatively, the look-up table provides one particular coefficient corresponding to the situation of a transmission of E-HICH channel in inter-cell handover, where the RLS (Radio Link Set) does not contain the serving E-DCH cell.

Further, the look-up table provides one particular coefficient corresponding to the situation of a transmission of E-HICH channel in inter-cell handover, where the RLS (Radio Link Set) contains the serving E-DCH cell.

In an embodiment, the look-up table provides one particular coefficient corresponding to the situation of a transmission of E-RGCH channel in single link.

In an further embodiment, the look-up table provides one particular coefficient corresponding to the situation of a transmission of E-RGCH channel in inter-cell handover where the E-RGCH belongs to the non-serving RL (Radio Link)

The invention embodiments further achieve an exemplary receiver for receiving a signal which is transmitted over a communication channel, said signal consisting in a sequence of the same symbol which is repeated during N sequential slots within one Time Transmission Interval (TTI), said symbol being taken from a ternary alphabet.

The exemplary receiver comprises:
  means for subtracting the symbol received at a certain time instant k to the following symbol received at the following time instant k+1 so as to eliminate signal contribution and isolate the noise contribution;
  means for summing (23, 11, 12) all consecutive received signals of the same TTI so as to isolate the transmitted signal contribution, plus some residual noise, said sum being later compared with a given threshold so as to determine which element of the ternary alphabet was originally transmitted;
  means for squaring said sum so as to obtain a chi squared distribution, central if the transmitted signal was 0, non-central if it was +1 or −1;
  means for determining a threshold proportional to said variance;
  means for using said threshold so as to perform detection of the communication channel.

Embodiments of the invention are particularly useful for achieving a telephone mobile fitted with a receiver achieving detection of the E-HICH and E-RGCH channels in the case of 3GPP Release 6 (HSUPA).

BRIEF DESCRIPTION OF THE DRAWINGS

Other features of one or more embodiments of the invention will best be understood by reference to the following detailed description when read in conjunction with the accompanying drawings.

DETAILED DESCRIPTION

There will now be described an exemplary embodiment of the invention which achieves the detection of the E-HICH and E-RGCH channels in the case of 3GPP Release 6 (HSUPA).

Briefly, the principle takes advantage of the fact that the signal (that may be either E-RGCH or E-HICH) transports the same transmitted symbol for N sequential slots, where N depends on the length of the TTI (Time Transmission Interval), whereas the noise contribution on each received signal is different. Therefore, by subtracting received signal (k) to signal (k+1) one can eliminate the signal contribution (if this is done within the same TTI, assuming the channel conditions do not vary much within the same TTI) and one isolates the noise contribution. From the noise contributions one can estimate the noise variance v. On the other hand, if one sums all consequent received signals of the same TTI, one can isolate the transmitted signal contribution, plus some residual noise. This variable follows a normal distribution where the mean is the unknown transmitted signal and the variance is what was estimated. By squaring the variable, one obtains a chi squared distribution, central if the transmitted signal was 0, non-central if it was +1 or −1. The cumulative distribution function is proportional to the variance, so we can set a threshold proportional to the variance in order to fix the % of values that pass the threshold. In such way we can control the % of missed detections and false detections.

Figure 2:
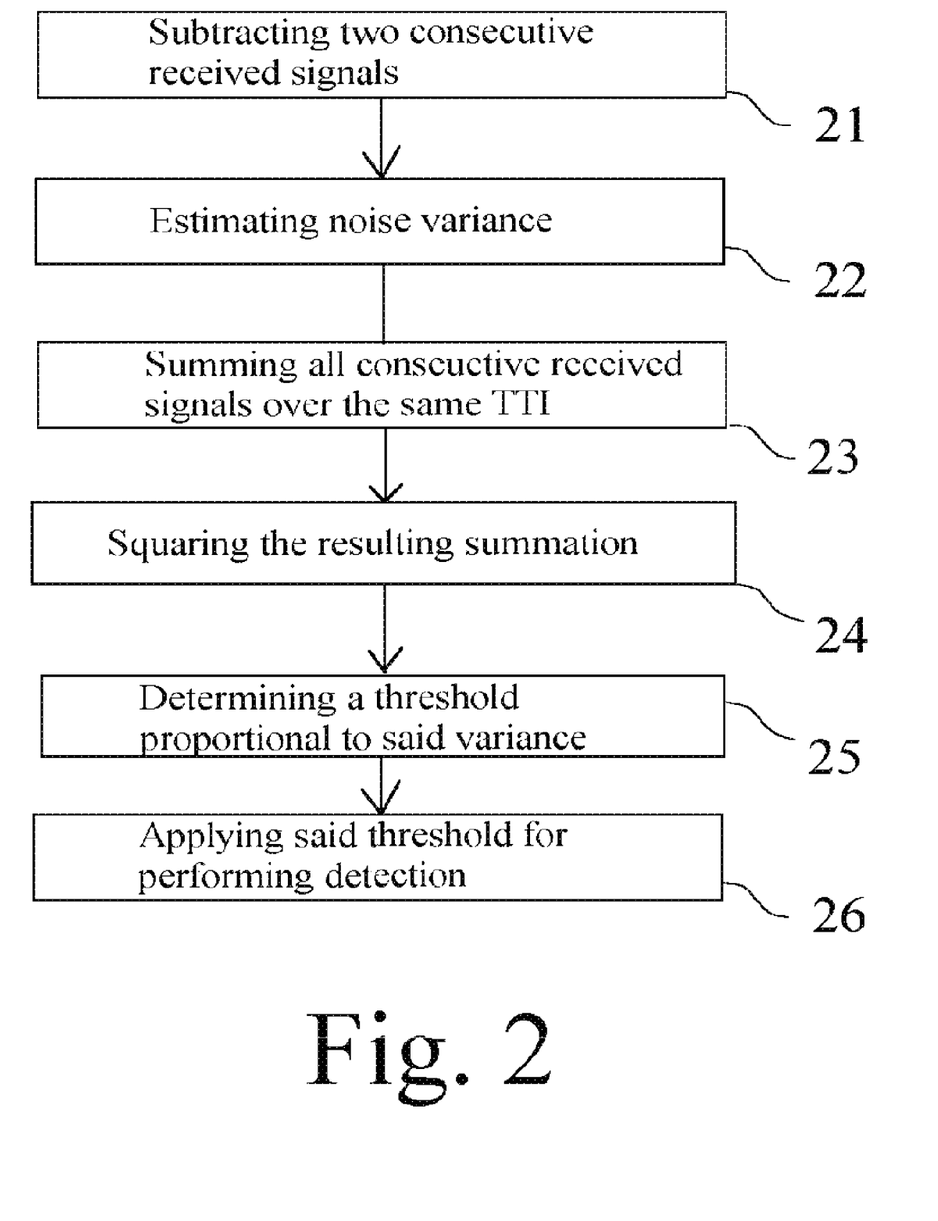
FIG. 2 illustrates one embodiment of a process for detecting the E-HICH and E-RGCH channels.

With respect to FIG. 2, there is now described with more details the basic steps of one process for achieving detection of a communication channel based on a ternary alphabet, such as the E-HICH and E-RGCH channels.

The process starts with a step 21 which consists in the extraction of the communication channels to be detected and the subtracting of two consecutive received signals so as to isolate the noise contribution.

As known by one skilled in the art, in the case of the E-HICH and E-RGCH communication channel for the 3GPP TS 25.211 (which is one particular embodiment), the indicator is required to be transmitted repeatedly for a number N of times (3, 12 or 15), each time modulated with a defined signature sequence. Different signature sequences are orthogonal between them so that transmitted signal on the E-HICH and the E-RGCH channel, which share the same OVSF code, do not interfere with each other. After correlating the received signal with a local signature sequence which is the same as the one used in transmission, the correlation output at transmit repetition time$^i$ can be expressed as:

$$\mathcal{R}_i = h_i \times S_i + N_i$$

where hi is the channel coefficient, Si is the transmitted signal correlated with the local signature, the first term hi×Si is the useful component for detection of indicator and the second term Ni is due to the background noise.

Both components depend on the propagation characteristics of the signal transmission since coherent demodulation is applied in Slave Rake. However the noise component is assumed to be Gaussian. The signal component depends on the channel estimation which is proportional to the channel coefficient.

Assuming the channel fading to be slow enough, if one correlates in the next repetition time (time$^{i+1}$) the received symbol level signal with the inverse of signature sequence of interest, one has:

$$\mathcal{R}_{i+1} = h_{i+1} \times S_{i+1} + N_{i+1} + I_{i+1_-} \approx -h_i \times S_i + N_{i+1}$$

where the term $I_{i+1}$ corresponds to the interference between the signature sequence of interest and those not of interest. This term is negligible and can be ignored.

Once the appropriate communication channel has been extracted, the process proceeds with a step 22 which consists in the estimation of the variance of the noise during a period coinciding with the TTI.

This is achieved by performing, in one embodiment, first a ZF (zero-forcing) algorithm, i.e., divide $\mathcal{R}_i$ and $\mathcal{R}_{i+1}$ by respectively $h_i^2$ and $h_{i+1}^2$ and sums $\mathcal{R}_{i+1}/h^2_{i+1}$ and $\mathcal{R}_{i+1}/h^2_{i+1}$. One notices that the noise component is essentially independent of the signature, and that multiplying by the inverse of the signature and summing $\mathcal{R}_{i+1}/h^2_{i+1}$ to $\mathcal{R}_i/h^2_i$ is the same as subtracting to $\mathcal{R}_{i+1}/h^2_{i+1}$ to $\mathcal{R}_i/h^2_i$.

By repeating the procedure over the whole TTI ($\mathcal{R}_{i+1}/h^2_{i+1} - \mathcal{R}_i/h^2_i$, $\mathcal{R}_{i+2}/h^2_{i+2} - \mathcal{R}_{i+1}/h^2_{i+1}$ and so on) so as to compute the variance of the resulting noise symbols $N_{i+1}$, $N_{i+2}$ etc, one has:

$$\text{Var}(\Lambda) = \text{Var}(\mathcal{R}_i + \mathcal{R}_{i+1})$$
$$= \text{Var}(N_i) + \text{Var}(N_{i+1})$$
$$= N_0$$

It should be noticed that, due to scaling factors applied during the signal processing in the receiver, a scaling is also applied to the RSCP value i.e. our estimation of $h_i^2$.

Once we have estimated the signal variance we can consider that the signal has a Gaussian distribution with the mean value proportional to the useful signal (+1, 0 or -1) and the variance which was estimated.

The process then proceeds to a step 23, which is a summation of the received signal over the N times it is transmitted, together with the application of a scaling for dynamic purposes (basically a division by K with K being 3, 5, 12 . . . ) in order to produce a value (corr_sig) representative of the received signal.

Then, in a step 24, the process proceeds with the squaring of the means received signal in order to generate a chi distribution of that signal.

Indeed, one has noticed that the difference between the cumulative distribution function of a normal distribution centered in 0 and of one centered in S is simply a shift of S. On the other hand, the difference between the cumulative distribution function of a chi-square distribution and the one of a non-central chi-square distribution is not a simple shift. The non-central chi-square distribution has a flatter profile, which means that higher values are more probable than in a chi-square distribution, even compensating the S shift.

Therefore, the embodiment illustrated in FIG. 2 takes advantage of such property and the squaring step 24 results in that the signals corresponding to a +/-1 will statistically have more higher values than the ones corresponding to a 0, and this spread will be higher than in a normal distribution case.

Consequently, the squaring step 24 applied on the received signal results in reducing the probabilities of false alarm or missed detection.

This is already a first exemplary significant advantage resulting from the process illustrated in FIG. 2.

In one embodiment, the detection process is based on a threshold which is determined, in a step 25, as being proportional to the estimated variance.

It has been observed, however, that for a constant value of the CDF (e.g. 95%), the value of the threshold grows linearly with the variance of the normal distribution that generated the chi-square. To compute the linearity coefficient by using the formula for chi-square and non-central chi-square distributions would be clearly too power-consuming.

In order to solve that problem and also for the purpose of providing a more accurate control of the detection process in the case of different situations, the process of FIG. 2 further involves a LUT (look-up table) which is read for the purpose of providing coefficients to multiplied to the noise variance estimation in order to fix the proper threshold for each different transmission scenario and 3GPP requirement.

In one particular optional embodiment, a filtering process is applied to the noise variance before the multiplication with the coefficient read from the LUT, so as to smooth the variability of the variance estimation.

Once determined, the threshold can be used by the process, in a step 26, so as to achieve proper detection of the communication channel.

A block diagram implementing the process described above is illustrated in FIG. 3, which can be used for detecting one ternary alphabet communication channel, be it E-RGCH or E-HICH.

Figure 3:
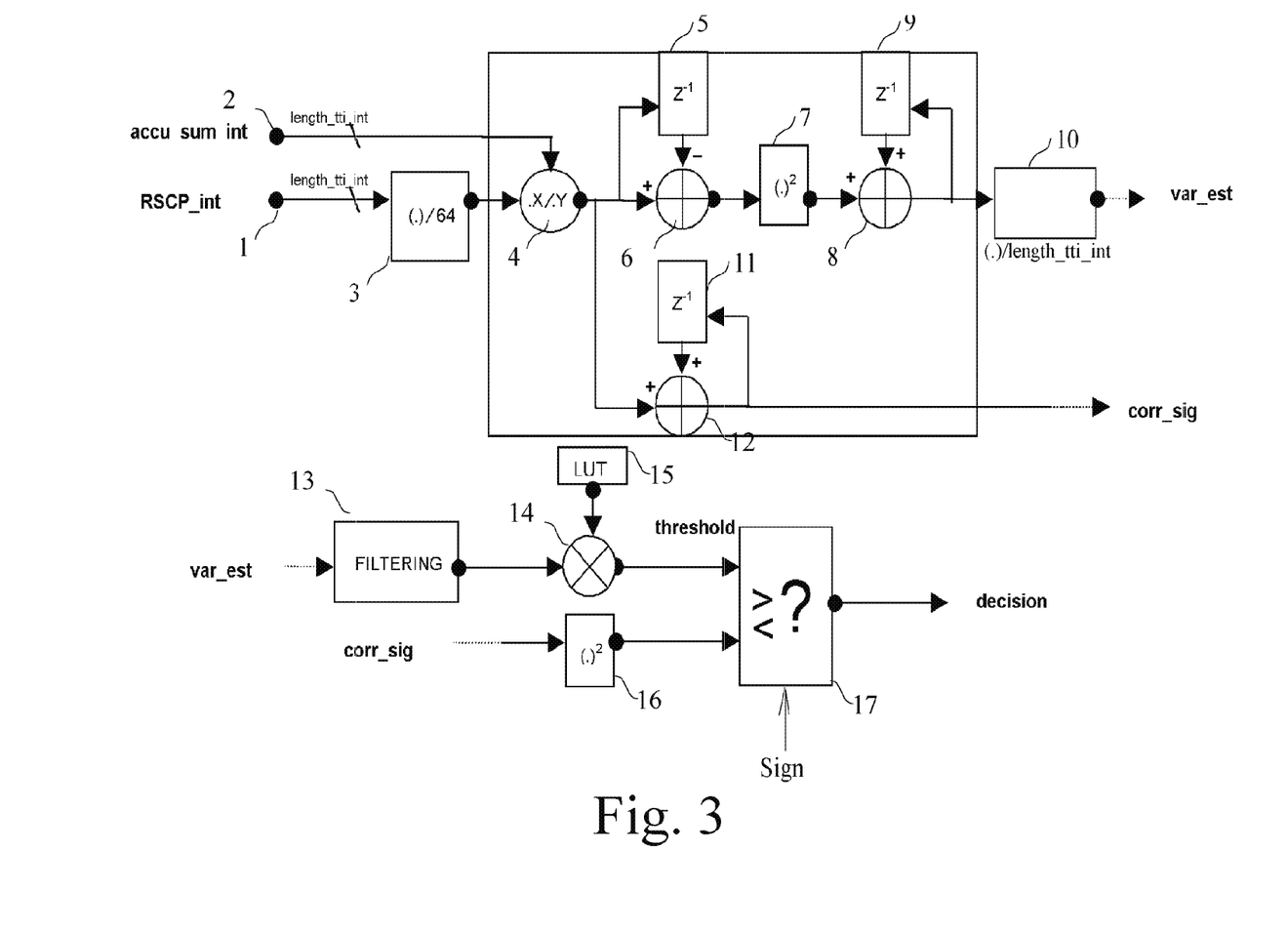
FIG. 3 illustrates one particular embodiment of a block diagram of the process for detecting the E-HICH and E-RGCH channels.

One assumes that the entries of the block diagram, respectively referred to as reference 1 and 2, consist in the estimation of the channel power and the received signal (E-RGCH or E-HICH) already separated from other channels via orthogonal sequences and spreading codes.

More particularly the channel power is represented by a parameter RSCP_int (Received Signal Code Power), and the received signal is represented by a parameter accu_sum_int).

FIG. 3 shows that, as mentioned above, a scaling is applied on the RSCP value by means of a divide-by-64 block 3 having an input receiving the value RSCP_int.

A dividing block 4 has two inputs, a first input receiving the signal (accu_sum_int) and a second input receiving the value generated by block 3.

It can be seen that blocks 3 and 4 embody the ZF zero forcing process of step 22.

One then sees that the output of block 4 is subject to two distinctive processing paths, a first path arranged for the estimation of the variance as described above, and a second path arranged for the computation of the average of the received signal over the whole TTI.

The first path includes the succession of blocks 6, 7, 8 and 10, together with the two delays 5 and 9, respectively having an input connected to the output of block 4 and the output of block 8.

Block 6 is a subtractor having a first input receiving the output of block 4 and a second input receiving the output of delay 5 providing the difference of two consecutive received signals, needed for the estimation of the noise contribution.

Block 7 performs a squaring of the output of subtractor 6.

Block 8 is an adder having a first input respectively receiving the output of squaring block 7 and the output of delay 9, so as to provide the whole summation of all noise contributions.

Block 10 is a divider by a scalar—(length_tti_int) so as to normalize the value of the variance estimation.

The second path is based on adder 12, having a first input receiving the output of block 4 and a second input receiving the delayed version of adder 12, so as to achieve the summation of all the received signals—namely a value corr_sig—over the whole period TTI.

With respect to FIG. 3 again, the variance estimation is then inputted into an optional filtering block 13—basically a low pass filter—before being forwarded to a first input of a multiplier 14, a second input of which receives the output of the Look-up-table 15.

On the other hand, the summation of all the received signals, namely signal corr_sig is entered into a squaring block 16 so as to achieve the chi—conversion of the distribution.

The two outputs of multipliers 14 and squaring block 16 are entering into a decision block 17 which, also receives the value of the sign of the corr_sign before it is squared by squaring block 16.

Decision block performs a comparison of the squared received signal, together with the consideration of the sign, with the threshold computed in accordance with the contents stored in the LUT table, so as to achieve the determination and the detection of the signal received from the considered communication channel, E-HICH or E-RGCH.

It will now be discussed the arrangement of the look-up-table.

Clearly, a different LUT may be considered for the purpose of providing appropriate coefficients to be used for the determination of the threshold, and such coefficients will closely depend on the particular application being considered, and particularly on the communication channels (E-HICH and E-RGCH) to be detected.

In one particular embodiment, the LUT (Look-up table) consists in 9 values, each corresponding to one specific predetermined scenario.

The 9 scenarios have been chosen so as to fully match with the 3GPP specification TS 34.121-1 V7.5.0 (2007-06), chapter 10 *"Performance requirement (E-DCH)"*, each scenario corresponding to one particular set of requirements.

Each of the 9 values of the LUT, multiplied by the estimate of the variance, will give a decision threshold that will satisfy the good detection requirements proper to that scenario.

The $1^{st}$ and $2^{nd}$ scenarios being coded in the LUT, correspond to a transmission of E-HICH channel in single link, known to the skilled man. The reader is invited to refer more particularly to Chapter 10.2.1:

In case of integration length=12 slots (note: "Integration length" is the number of times that a same E-HICH or E-RGCH symbol is repeated, namely 3, 12 or 15.)
table 10.2.1.1.5.2 for MACK (Missed ACK=>a '1' is transmitted and is interpreted as a '0' or '−1')
table 10.2.1.1.5.3 for FACK (False ACK=>a '0' is transmitted and is interpreted as a '1')
to satisfy these requirements the decision threshold shall be set by multiplying the estimated variance with a coefficient in the LUT denominated $L_1$ In case of integration length=3 slots
table 10.2.1.2.5.2 for MACK (Missed ACK=>a '1' is transmitted and is interpreted as a '0' or '−1')
table 10.2.1.2.5.3 for FACK (False ACK=>a '0' is transmitted and is interpreted as a '1')
to satisfy these requirements the decision threshold shall be set by multiplying the estimated variance with a coefficient in the LUT denominated $L_2$ The $3^{rd}$ and $4^{th}$ scenarios being coded in the LUT correspond to a transmission of E-HICH channel in inter-cell handover, where the RLS (Radio Link Set) does not contain the serving E-DCH cell.

The requirements for these scenarios are more particularly listed in chapter 10.2.2.1:

In case of integration length=12 slots
table 10.2.2.1.1.5.2 for MACK (Missed ACK=>a '1' is transmitted and is interpreted as a '0' or '−1')
table 10.2.2.1.1.5.3 for FACK (False ACK=>a '0' is transmitted and is interpreted as a '1')
to satisfy these requirements the decision threshold shall be set by multiplying the estimated variance with a coefficient in the LUT denominated $L_3$ In case of integration length=3 slots
table 10.2.2.1.2.5.2 for MACK (Missed ACK=>a '1' is transmitted and is interpreted as a '0' or '−1')
table 10.2.2.1.2.5.3 for FACK (False ACK=>a '0' is transmitted and is interpreted as a '1')
to satisfy these requirements the decision threshold shall be set by multiplying the estimated variance with a coefficient in the LUT denominated $L_4$ The $5^{th}$ and $6^{th}$ scenarios correspond to a transmission of E-HICH channel in inter-cell handover, where the RLS (Radio Link Set) contains the serving E-DCH cell.

The requirements for these scenarios are listed in chapter 10.2.2.2:

In case of integration length=12 slots
table 10.2.2.2.1.5.2 for MACK (Missed ACK=>a '1' is transmitted and is interpreted as a '0' or '−1')
table 10.2.2.2.1.5.3 for FACK (False ACK=>a '0' is transmitted and is interpreted as a '1')
to satisfy these requirements the decision threshold shall be set by multiplying the estimated variance with a coefficient in the LUT denominated $L_5$ In case of integration length=3 slots
table 10.2.2.2.2.5.2 for MACK (Missed ACK=>a '1' is transmitted and is interpreted as a '0' or '−1')
table 10.2.2.2.2.5.3 for FACK (False ACK=>a '0' is transmitted and is interpreted as a '1')
to satisfy these requirements the decision threshold shall be set by multiplying the estimated variance with a coefficient in the LUT denominated $L_6$ The $7^{th}$ and $8^{th}$ scenarios correspond to a transmission of E-RGCH channel in single link.

The requirements for these scenarios are described in chapter 10.3.1:

In case of integration length=12 slots
table 10.3.1.1.5.2 for MUD (Missed UP or DOWN=>either a '1' is transmitted and is interpreted as a '0' or a '−1', or a '−1' is transmitted and is interpreted as a '0' or a '1')
table 10.3.1.1.5.3 for MHOLD (Missed HOLD=>a '0' is transmitted and is interpreted as a '1' or a '−1')
to satisfy these requirements the decision threshold shall be set by multiplying the estimated variance with a coefficient in the LUT denominated $L_7$ In case of integration length=3 slots
table 10.3.1.2.5.2 for MUD (Missed UP or DOWN=>either a '1' is transmitted and is interpreted as a '0' or a '−1', or a '−1' is transmitted and is interpreted as a '0' or a '1')
table 10.3.1.2.5.3 for MHOLD (Missed HOLD=>a '0' is transmitted and is interpreted as a '1' or a '−1')
to satisfy these requirements the decision threshold shall be set by multiplying the estimated variance with a coefficient in the LUT denominated $L_8$ The 9$^{th}$ scenario corresponds to a transmission of E-RGCH channel in inter-cell handover where the E-RGCH belongs to the non-serving RL (Radio Link)

The requirements for this scenario are described in chapter 10.3.2:

There is only one case of integration length =15 slots
table 10.3.2.5.2 for MHOLD (Missed HOLD=>a '0' is transmitted and is interpreted as a '1' or a '−1')
table 10.3.2.5.3 for MDOWN (Missed DOWN=>a '−1' is transmitted and is interpreted as a '0' or a '1')
to satisfy these requirements the decision threshold shall be set by multiplying the estimated variance with a coefficient in the LUT denominated $L_9$ As described above with details, embodiments of the invention solve the problem of determination of a threshold to be used in the decision making process based on an estimation of the noise variance and the assumption that the noise is originally AWGN (Additive White Gaussian Noise). To achieve this, one takes advantage of the statistical characteristics of Gaussian distributions and of its closely-related non-central chi squared distribution. This will permit us to set a threshold to detect whether a +S, a −S or a 0 was received.

Invention embodiments provide an optimized detection process achieving proper minimizing of false alarms (a "0" which is being detected as a "1" or a "−1") and also misdetection (either a "+1" or a "−1" being detected as a "0"). This is achieved even though one has no information on the amplitude S of the signal, nor on the value of the noise. The threshold determination is based, as described below, on noise variance estimation, zero-forcing, and on the properties of non-central chi-square distribution.

This algorithm has been tested against the 3GPP E-HICH/E-RGCH detection requirements and it satisfies all requirements with a minimum margin of 1.2 dB.

The invention claimed is:

1. A detection process of receiving a signal that was transmitted over a communication channel, the signal being in a sequence of a same symbol that is repeated during N sequential slots within one Transmission Time Interval (TTI), said symbol being extracted from a ternary alphabet, said detection process comprising:
   subtracting the symbol received at a certain time instant k from a following symbol received at the following time instant k+1 so as to eliminate symbol contribution and isolate a noise contribution;
   estimating a noise variance v by performing the subtracting step N−1 times corresponding to a period of N symbols in the received signal and thus isolating N−1 contributions, and estimating the noise variance by summing squares of the N−1 contributions;
   summing all consecutive received signals of the same TTI so as to isolate a transmitted signal contribution, plus some residual noise so as to generate a signal sum;
   squaring the signal sum so as to obtain a chi squared distribution;
   determining a threshold proportional to the variance; and
   comparing said threshold to a value comprising the chi squared distribution and a sign of the signal sum to determine which element of the ternary alphabet was originally transmitted over the communication channel.

2. The detection process according to claim 1, wherein estimating the noise variance further comprises subjecting the estimated variance to filtering before using the estimated variance for determining said threshold.

3. The detection process according to claim 2 wherein the filtering is a low-pass filtering adapted to average the variation of the estimated variance over the whole TTI.

4. The detection process according to anyone of claim 1, wherein the communication channel is an E-HICH channel decoded after despreading and signature correlation, as defined in 3GPP specification (TS 25.211 V7.2.0. (2007-05).

5. The detection process according to claim 4, wherein the threshold is further determined by computing the multiplication of the estimated variance with a coefficient that is provided by a look-up-table.

6. The detection process according to claim 5, wherein the look-up table provides a particular coefficient corresponding to a situation of a transmission of E-HICH channel in single link.

7. The detection process according to claim 5, wherein the look-up table provides a particular coefficient corresponding to a situation of a transmission of E-HICH channel in inter-cell handover, where a Radio Link Set R.L.S. does not contain a serving E-DCH cell.

8. The detection process according to claim 5, wherein the look-up table provides a particular coefficient corresponding to a situation of a transmission of E-HICH channel in inter-cell handover, where a Radio Link Set R.L.S contains a serving E-DCH cell.

9. The detection process according to claim 5, wherein the look-up table provides a particular coefficient corresponding to a situation of a transmission of E-RGCH channel in single link.

10. The detection process according to claim 5, wherein the look-up table provides a particular coefficient corresponding to a situation of a transmission of E-RGCH channel in inter-cell handover where an E-RGCH belongs to the non-serving Radio Link RL.

11. The detection process according to claim 1, wherein the communication channel is an E-RGCH channel decoded after despreading and signature correlation, as defined in 3GPP specification (TS 25.211 V7.2.0. (2007-05).

12. A receiver for receiving a signal transmitted over a communication channel, the signal being in a sequence of a same symbol repeated during N sequential slots within one Transmission Time Interval (TTI), the symbol being extracted from a ternary alphabet, the receiver comprising:
   a subtraction block adapted to subtract the symbol received at a certain time instant k from a following symbol received at a following time instant k+1 so as to eliminate symbol contribution and isolate a noise contribution;
   an estimation block adapted to estimate a noise variance v by summing squares of N−1 contributions corresponding to a period of N symbols in the received signal;
   a summing block adapted to sum all consecutive received signals of the same TTI so as to isolate a transmitted signal contribution, plus some residual noise so as to generate a signal sum;
   a squaring block adapted to square the signal sum so as to obtain a chi squared distribution,
   a determining block adapted to determine a threshold proportional to the variance;
   a comparing block adapted to compare the threshold to a value comprising the chi squared distribution and a sign of the signal sum to determine which element of the ternary alphabet was originally transmitted over the communication channel.

13. The receiver according to claim 12, wherein the communication channel is an E-HICH channel or a E-RGCH channel decoded after being despread and signature correlation.

14. The receiver according to claim 13, further comprising a look-up-table (LUT) for the purpose of generating one coefficient in each of the following situations:

(a) transmission of an E-HICH channel in single link;
(b) transmission of the E-HICH channel in inter-cell handover, where an RLS (Radio Link Set) does not contain a serving E-DCH cell;
(c) transmission of the E-HICH channel in inter-cell handover, where the RLS (Radio Link Set) contains the serving E-DCH cell;
(d) transmission of an E-RGCH channel in single link;
(e) transmission of the E-RGCH channel in inter-cell handover where the E-RGCH belongs to the non-serving RL (Radio Link).

15. A mobile telephone comprising the receiver of claim 12.

* * * * *